United States Patent Office 3,472,888
Patented Oct. 14, 1969

3,472,888
PREPARATION OF VINYLOXY CONTAINING ORGANOSILICON COMPOUNDS
André René Marcel Bazouin and Jacques Paul Dunogues, Lyon, and Marcel Joseph Celestin Lefort, Caluire, France, assignors to Rhone-Poulenc S.A., Paris, France, a French body corporate
No Drawing. Filed Oct. 12, 1965, Ser. No. 495,324
Claims priority, application France, Oct. 12, 1964, 991,132; June 29, 1965, 22,792
Int. Cl. C07f 7/18
U.S. Cl. 260—448.8                              5 Claims

ABSTRACT OF THE DISCLOSURE

Organosilicon compounds containing a vinyloxy group attached to silicon are prepared by reacting an organosilane chloride with an enolisable aldehyde or ketone in the presence of zinc chloride and a binding agent for the hydrogen chloride liberated.

---

This invention relates to the preparation of organosilicon compounds, comprising ether functions the oxygen atoms of which are bonded on the one hand to silicon and on the other hand to a vinyl or substituted vinyl radical.

It is known to prepare vinyloxysilanes by reaction of $\alpha,\beta$-ethylenic aldehydes or ketones with hydrogenosilanes in the presence of chloroplatinic acid (Petrov et al., Bull. Soc. Chim. France (1959), 1932–1933; idem, Izv. Akad. Nauk (1958), 1954–963; Sadykh Zade et al., Proc. Acad. Sci. U.S.S.R. 121, 523 (1958); idem, Zhur. Obshchei. Khim. 29, 3194–3198 (1959)), the reaction being effected by addition of the hydrogenosilane to the carbonyl compound in accordance with the reaction scheme.

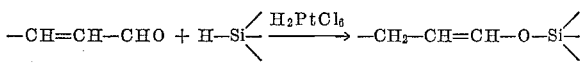

This process has the disadvantage of involving the use of silicon compounds which are not very convenient to prepare and are in consequence costly. Attempts have accordingly been made to prepare enoxysilanes from organochlorosilanes which are the customary starting materials in the preparation of organosilicon compounds. To accomplish this purpose, the chlorosilanes have been caused to react with aldehyde or ketone compounds which have been converted beforehand into alkaline derivatives (Kruger et al. J. Org. Chem. 1, 476 (1964)) or mercuric derivatives (Nesmeyanov et al. Proc. Acad. Sci. U.S.S.R. 128, 785 (1959)). This intermediate phase involves the use of metallic derivatives which are frequently not very easy to prepare, and consequently represents a serious disadvantage.

It has also been proposed to prepare an alkenyloxysilane by condensation of acetone with triethylsilane in the presence of an alkali metal (Kharitonov et al., Khim, i Prokt. Primeneme Kremncorg. Soedinii No. 1,217–220 (1958)), but the product obtained in this reaction has been shown not to be the expected mixed enolic ether (Nesmeyanov et al. loc. cit.)

It has now been found that it is possible to prepare compounds containing the group:

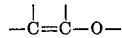

hereinafter called the vinyloxy groups, attached to a silicon atom from enolisable aldehydes and ketones, without the preparation of intermediate metallic derivatives or the use of compounds containing Si—H groups. The new process comprises reacting an organosilicon compound containing a chlorine atom attached to a silicon atom with an aldehyde or ketone containing an enolisable carbonyl group, in the presence of zinc chloride and a reagent binding the liberated hydrogen chloride. This process has the advantages of being simple and of using, in many cases, compounds with chlorine-silicon bonds which are readily accessible.

This process may be generally represented by the following reaction scheme, in which the aldehyde or ketone is represented in the enolic form, the symbol R represents a monovalent organic radical, the symbols $R_1$, $R_2$ and $R_3$ each represent hydrogen or a monovalent organic radical free from substituents reactive under the conditions of the process, especially aliphatic, alicyclic, aromatic, or araliphatic hydrocarbon radicals, $n$ is 1, 2 or 3, and B represents the neutralisation agent.

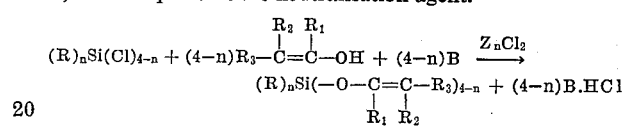

As the enolisable aldehyde or ketone, it is possible to use any organic compound comprising at least one enolisable carbonyl group and optionally other functional groups, provided that, under the conditions of the reaction, these other functional groups do not disturb the reaction set out diagrammatically above, and do not, or substantially do not, give any side reactions. The enolisable group may be of the formula:

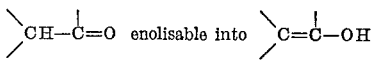

or of the formula:

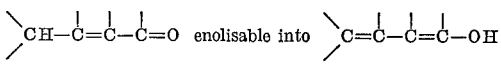

Furthermore, the same carbonyl group may be enolisable in more than one way, for example as follows:

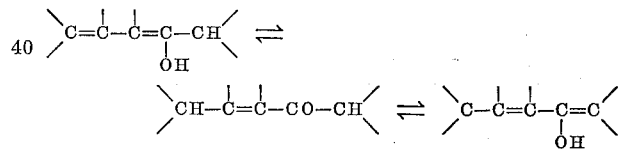

In such a case, a mixture of organosilicon compounds is obtained in the process of the invention, each of them having a structure corresponding to that of the enolic structure from which it originated.

The enolisable carbonyl compound used in this invention can, in general, be represented by the general formula:

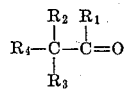

in which $R_1$, $R_2$, $R_3$ and $R_4$ may assume any signification compatible with the enolisation process, and are each hydrogen atoms, aliphatic, alicyclic, aromatic or araliphatic monovalent hydrocarbon radicals free from reactive substituents, i.e. substituents capable of interfering with the reaction in question, but optionally carrying unreactive substituents, including in particular, oxo groups. Two of the radicals $R_1$, $R_2$, $R_3$, $R_4$ may in addition together form a divalent hydrocarbon radical which may optionally carry substituents as defined above. In addition two of the radicals $R_2$, $R_3$ and $R_4$ may be combined into a divalent hydrocarbon radical having its two free valencies attached to the same carbon atom, which may itself also carry substituents as indicated above. It is to be understood that, in all the radicals mentioned the bonds between carbon atoms are single bonds, aromatic double bonds, or olefinic double bonds one of which may be in the α-position to a carbonyl group. The symbols $R_2$ and $R_3$ may also each represent a functional group which is non-reactive under the working conditions, for example an acyl radical, such as acetyl, propionyl, or butyryl, or an alkoxycarbonyl radical, such as ethoxycarbonyl or propoxycarbonyl.

More particularly, the enolisable aldehydes or ketones may have, in the enolisable form, the formulae

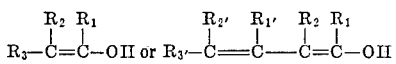

in which $R_1$, $R_2$, $R_3$, $R_{1'}$, $R_{2'}$ and $R_{3'}$ each represent hydrogen atoms, alkyl radicals, especially lower alkyl radicals (i.e. alkyl radicals of 1 to 6 carbon atoms) such as methyl, ethyl, propyl, and butyl, saturated alicyclic radicals such as cyclopentyl or cyclohexyl; aryl radicals, especially phenyl and phenyl substituted by lower alkyl radicals or by substituents which are incapable of interfering with the reaction, aralkyl radicals, particularly phenylalkyl radicals, such as benzyl and phenylethyl. Two of the radicals $R_1$, $R_2$ and $R_3$ or $R_1$, $R_{1'}$, $R_{2'}$, $R_{3'}$ may also together form a divalent radical, such as trimethylene or tetramethylene. One of the symbols $R_{1'}$, $R_{2'}$ and $R_{3'}$ may also represent an aliphatic or alicyclic radical containing olefinic unsaturation.

Especially valuable such starting materials are those in which $R_1$, $R_2$, $R_3$, $R_{1'}$, $R_{2'}$ and $R_{3'}$ are each hydrogen, alkyl of 1 to 6 carbon atoms, alkenyl of 1 to 6 carbon atoms, cycloalkyl of 5 or 6 carbon atoms, phenyl, alkylphenyl of 7 to 12 carbon atoms, or phenylalkyl of 7 to 12 carbon atoms.

Even more specifically, it is possible to use, as enolisable compounds: linear aliphatic aldehydes such as acetaldehyde, propionaldehyde, butyraldehyde and enanthylaldehyde, or branched aliphatic aldehydes such as isobutyraldehyde, and isovaleraldehyde, as well as cyclic aldehydes, such as hexahydrobenzaldehyde and the methyl-hexahydrobenzaldehydes; saturated aliphatic monoketones, such as acetone, methyl ethyl ketone, diethylketone, methyl propyl ketone, methyl butyl ketone and methyl nonyl ketone, enolisable aliphatic polyketones, such as acetyl acetone, acetonyl acetone, ketones comprising an aromatic radical, such as acetophenone, propiophenone, benzyl acetone and acetophenone acetone, cyclanones such as cyclopentanone, methyl cyclopentanones, cyclohexanone, methyl cyclohexanones, and ketone esters such as ethyl acetoacetate; α-ethylenic aldehydes such as crotonaldehyde, β-ethyl-acrolein, β,β-dimethyl-acrolein, β-propyl-acrolein, β-butyl-acrolein, dihydro-6,7-citral, tiglic aldehyde, α,β-dimethyl-acrolein, citral, vinyl-crotonaldehyde, farnesal and sorbital; enolisable α-ethylenic ketones, such as ethylidene acetone, propylidene acetone, butylidene acetone, isobutylidene acetone, mesityl oxide, phorone, cyclopent-1-en-3-one, cyclohex-1-en-3-one, isophorone, carvone, carvenone, and α-ionone.

As organosilicon compound containing a chlorine atom attached to a silicon atom, it is possible to use any organosilicon compound containing at least one silicon atom and at least one chlorine-silicon bond. Such compounds may contain any substituent which does not disturb the reaction set out diagrammatically above and does not lead to any, or substantially no, side reactions. In the formula given above, the groups R may be identical or different and may be alkyl, cycloalkyl, aryl, aralkyl, alkoxy, cycloalkoxy, aryloxy or aralkoxy radicals, and these various radicals may carry substituents that remain inert or practically inert under the working conditions chosen. The symbols R may also represent organosilyl or organosilyloxy radicals or monovalent hydrocarbon radicals substituted by one or more organosilyl radicals, optionally containing in addition one or more chlorine-silicon bonds. Preferably each R group is alkyl of 1 to 6 carbon atoms or phenyl.

The following are examples of specific compounds useful in the new process: chloromonosilanes, such as methyltrichlorosilane, ethyltrichlorosilane, phenyltrichlorosilane, propyltrichlorosilane, dimethyldichlorosilane, diethyldichlorosilane, diphenyldichlorosilane, trimethylchlorosilane, divinyldichlorosilane, dicyclohexyldichlorosilane, and triallylchlorosilane; chlorodisilanes, such as 1,1,1-triphenyl - 2,2,2 - trichlorodisilane, pentaphenylchlorodisilane, pentamethylchlorodisilane, symmetrical tetramethyldichlorodisilane; bis-(chlorosilyl)alkanes, such as 1,2-bis-(methyldichlorosilyl)-ethane, 1,2-bis-(trichlorosilyl)-ethane, 1,2-bis-(trichlorosilyl)-hexane and 1,2-bis-(ethyldichlorosilyl)-ethane; chlorosiloxanes, such as diphenyldimethyldichlorodisiloxane, tetramethyldichlorodisiloxane, divinyltetrachlorodisiloxane, and dichloro-α,ω-poly-(dimethyl)polysiloxanes.

As already indicated, the new process comprises not only the case where a chloromonosilane is caused to react with a monocarbonyl compound, but also the case where organic compounds having several carbonyl functions and silicon compounds having several silicon atoms, of which several carry a chlorine atom or atoms are caused to react. However, the present invention is more especially concerned with the reaction of chlorosilanes with monoaldehydes or monoketones.

Similarly, the process according to the invention is not limited to reactions between a single specific silicon compounds and a single specific carbonyl compound. A mixture of silicon compounds such as those previously defined can be reacted with one or more of the carbonyl compounds previously considered. Nevertheless, in practice, reactions between a single compound of each category are of greatest interest.

As is evident from the reaction diagram previously given, it is theoretically sufficient for the quantities of compounds used to be such that the number of Si—Cl bonds provided by the silicon compound is equal to the number of enolisable carbonyl functions provided by the organic compound. It is, however, generally advantageous to work with an exces of carbonyl compound. This excess may vary according to the physical state of this compound and will be greater when the carbonyl compound does not have a very high boiling point, e.g. less than 100° C. However, a greater excess than two equivalents of enolisable group per silicon-chlorine bond is generally wasteful.

It is often convenient to use an organic diluent which is inert under the operational conditions in order to facilitate the dispersion of the solid phase in the reaction medium. For this purpose aliphatic ethers and aliphatic and aromatic hydrocarbons, both halogenated and non-halogenated, are suitable.

As already stated, the hydrogen chloride formed during the reaction is neutralised. As the neutralising agent, it is preferred to use an organic base, especially tertiary amines. Triethylamine and the dialkylanilines are particularly convenient to use. The amount of neutralising agent will, of course, be at least sufficient to neutralize all the hydrogen chloride liberated, but need not be much greater than this. More than a 50% excess is generally superfluous.

The quantity of zinc chloride used as catalyst is not critical. It may vary within fairly wide limits, for example, between 0.1 g. and 5 g. of catalyst to 100 g. of silicon compound used. Quantities of the order of 0.5 to 2% of the weight of silicon compound are particularly suitable.

It is preferable to work with reactants which are as anhydrous as possible and to operate under conditions which exclude from the reaction any source of humidity.

The reaction temperature may vary within fairly wide limits, and according to the reactants which are present. It is possible to work at ambient temperature, i.e. about 20° C., or at elevated temperature, for example with reflux of the solvent used as reaction medium, or with cooling to the region of 0° C. With certain aldehydes, the reaction can readily be carried out at relatively low temperatures.

In practice, the reaction is conveniently carried out as follows. The silicon compound in solution is added to a mixture formed of the enolisable organic compound, the catalyst, the neutralising agent and optionally a diluent, at ambient temperature or with cooling, and then if desired, the mixture is heated for the time necessary to obtain the desired products.

When at least one of the reactants has a boiling point lower than the reaction temperature, it is possible to introduce the reactants into an autoclave and then to bring them to the temperature chosen for the reaction. When this has taken place, the separation of the compound formed having vinyloxysilane groups can be effected by any suitable method of separation, for example by distillation of the liquid phase, after separation of the solid products (the hydrochloride of the base employed and zinc chloride).

The compounds produced in accordance with this invention of the formula:

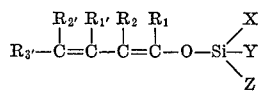

in which one of X, Y and Z is a hydrocarbon radical free from reactive substituents as hereinbefore defined and the other two are each either a hydrocarbon radical as aforesaid or a grouping of formula:

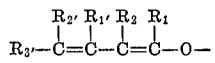

and each of $R_1$, $R_2$, $R_{1'}$, $R_{2'}$ and $R_{3'}$ is hydrogen or a hydrocarbon radical free from reactive substituents as hereinbefore defined, are new compounds and as such within the scope of the invention. Preferred such compounds are those in which one of X, Y and Z is alkyl of 1 to 6 carbon atoms or phenyl and the other two are each either alkyl of 1 to 6 carbon atoms, phenyl, or a grouping of formula:

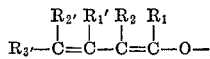

and each of $R_1$, $R_2$, $R_{1'}$, $R_{2'}$ and $R_{3'}$ is hydrogen, alkyl of 1 to 6 carbon atoms, alkenyl of 1 to 6 carbon atoms, or phenyl.

The following examples illustrate the invention.

EXAMPLE 1

150 cc. of benzene, 216 g. (1.8 mol.) of acetophenone, 202 g. (2 mols.) of triethylamine and 1 g. of zinc chloride are introduced into a 1-litre round bottom flask equipped with a mechanical stirrer, a reflux condenser connected to a drying tube, a dropping funnel, and a thermometer. 100 g. (0.76 mol.) of dimethyldichlorosilane are then added in about 15 minutes with stirring. The reaction mixture is refluxed for 4 hours. After cooling, the triethylamine hydrochloride is filtered off and washed with anhydrous benzene. Distillation of the liquid phase leads to 254.5 g. of dimethyl-bis(1-phenyl-1-ethenyloxy)silane, B.P.=128–129° C./1 mm. Hg, $n_D^{20}$=1.5558, $d_4^{20}$=1.0537.

If the reaction is repeated without the zinc chloride, only 54 g. of dimethyl-bis(1-phenyl-ethenyloxy)silane are isolated.

EXAMPLE 2

72 g. (1 mol.) of butyraldehyde, 50.5 g. (0.5 mol.) of triethylamine and 0.5 g. of zinc chloride are introduced into a 500 cc. round bottom flask, equipped as in Example 1. 54.5 g. (0.5 mol.) of trimethylchlorosilane are then added in 1 hour with stirring and the mixture is heated to 90° C. for 4 hours. After cooling, and working up as in Example 1, 68 g. of triethylamine hydrochloride are separated and then, by distillation of the liquid phase, 45 g. of (1-butenyloxy)-trimethylsilane are isolated, B.P.=120° C., $n_D^{20}$=1.4061, $d_4^{20}$=0.790.

EXAMPLE 3

Proceeding as in Example 2, but replacing the butyraldehyde by isobutyraldehyde, 46.5 g. of (1-isobutenyloxy)trimethylsilane are isolated, B.P. 119° C., $n_D^{20}$=1.4070, $d_4^{20}$=0.792.

EXAMPLE 4

58 g. (1 mol.) of acetone, 50.5 g. (0.5 mol.) of triethylamine, and 0.8 g. of zinc chloride are introduced into a 500 cc. round bottom flask, equipped as described in Example 1. 54.5 g. (0.5 mol.) of trimethylchlorosilane are then added in 20 minutes and the mixture is heated under reflux with stirring for several hours. The mixture is worked up as described in Example 1, and after separation of triethylamine hydrochloride (64 g.), 44.9 g. of (isopropenyloxy)-trimethylsilane are isolated, B.P. 93–94° C., $n_D^{20}$=1.3961, $d_4^{20}$=0.780.

EXAMPLE 5

33 g. (0.3 mol.) of cyclohexanone, 41 g. (0.4 mol.) of triethylamine, and 0.9 g. of zinc chloride are introduced into an apparatus identical with that described in Example 4. 36.2 g. (0.3 mol.) of trimethylchlorosilane are then added with stirring in ten minutes and the mixture is refluxed for 30 minutes. The reaction mixture is then worked up as previously described and 31.2 g. of (1-cyclohexenyloxy)-trimethylsilane are isolated by distillation, B.P. 165° C., $n_D^{20}$=1.4461, $d_4^{20}$=0.882.

EXAMPLE 6

64.5 g. (0.5 mol.) of dimethyldichlorosilane are caused to react with a mixture of 100.8 g. (1.4 mol.) of isobutyraldehyde and 101 g. (1 mol.) of triethylamine containing 0.5 g. of zinc chloride, the reaction temperature being kept at 35–40° C. The reaction mixture is then diluted with 115 cc. of benzene and worked up as described in the previous examples. 63 g. of di-(1-isobutenyloxy)-dimethylsilane are obtained, B.P.=83°–83.5° C./23 mm. Hg, $n_D^{20}$=1.4308, $d_4^{20}$=0.8705.

EXAMPLE 7

Using the equipment described in Example 1, 65 g. (0.25 mol.) of 1,2-bis-(methyldichlorosilyl)ethane dissolved in 100 g. of acetone are progressively added in 1 hour and with stirring to a solution of 103 g. (1.02 mol.) of triethylamine in 100 g. of acetone containing 1 g. of zinc chloride. The mixture is then heated for 12 hours under reflux with stirring and worked up as described in the preceding examples. 49.5 g. of 1,2-bis-(methyl-di-(1-isopropenyloxy)silyl)ethane are obtained as a limpid solution, B.P.=102° C./0.4 mm. Hg, $n_D^{20}$=1.4511, $d_4^{20}$=0.963.

EXAMPLE 8

220 g. (5 mols.) of acetaldehyde, 252.5 g. (2.5 mols.) of triethylamine, and 1.5 g. of zinc chloride are introduced into a 1-litre round bottom flask equipped as described in Example 1. 271.2 g. (2.5 mols.) of trimethylchlorosilane are then added progressively and with stirring, the reaction mixture being cooled to keep it in the region of 0° C. This operation lasts approximately 2 hours. The mixture is allowed to warm up to ambient temperature and is then stirred for a few hours. The precipitated triethylamine hydrochloride is filtered off and washed with anhydrous benzene. It weighs 324 g. (dry weight). Distillation of the liquid phase gives 185 g. of vinyloxytrimethylsilane, B.P. 74° C., as a colourless liquid, $n_D^{20}$=1.3892, $d_4^{20}$=0.7759.

EXAMPLE 9

100 cc. of benzene, 250 g. (2.47 mols.) of triethylamine, 203 g. (2.5 mols.) of acetone, 1.5 g. of zinc chloride, and 120.5 g. (0.8 mol.) of methyltrichlorosilane are introduced successively into a 1-litre autoclave.

This is heated for 14 hours at 110° C. After cooling, the contents of the autoclave are worked up as previously described and 325 g. of triethylamine hydrochloride are separated. 125 g. of methyl tri-(isopropenyloxy)-silane are then isolated, by distillation, B.P.=75° C./19 mm. Hg, $n_D^{20}=1.4267$, $d_4^{20}=0.9285$.

EXAMPLE 10

48 g. (0.66 mol.) of methylethyl ketone, 68 g. (0.67 mol.) of triethylamine, 100 cc. of benzene, and 1 g. of zinc chloride are introduced into the equipment described in Example 1. 72.5 g. of trimethyl chlorosilane dissolved in 100 cc. of benzene are then added with stirring during 3½ hours. The mixture is heated under reflux for 9 hours and worked up as described in Example 1. Distillation of the liquid phase gives 20 g. of unreacted methyl ethyl ketone and 47 g. of a colourless liquid which distills at 117–118° C. and contains 80% of (1-methyl-1-propenyloxy)trimethylsilane and 20% of (1-ethylvinyloxy)-trimethylsilane.

EXAMPLE 11

300 cc. of benzene, 102 g. (1.01 mol.) of triethylamine, 2 g. of zinc chloride, 116 g. (2 mols.) of acetone, and 126.5 g. (0.5 mol.) of diphenyldichlorosilane are successively introduced into a 1-litre autoclave. The contents of the autoclave are heated to 140° C. for 24 hours and then, after cooling, 118 g. of triethylamine hydrochloride are separated by filtration. Distillation of the liquid gives 84 g. of diphenyldiisopropenyloxysilane, B.P.=134–136° C./0.9 mm. Hg, $n_D^{20}=1.5497$, $d_4^{20}=1.085$.

EXAMPLE 12

The operation is carried out as in Example 11 with 300 cc. of benzene, 151.5 g. (1.5 mols.) of triethylamine, 0.5 g. of zinc chloride, 144 g. (2 mols.) of isobutyraldehyde and 74.7 g. (0.5 mol.) of methyl trichlorosilane, the mixture being heated to 140° C. for 4 hours. After cooling, 210 g. of triethylamine hydrochloride are separated by filtration and then 76 g. of tris-(2-methyl-1-propenyloxy)-methylsilane are obtained by distillation of the liquid phase, B.P.=112.5–113° C./16 mm. Hg, $n_D^{20}=1.4400$, $d_4^{20}=0.9153$.

EXAMPLE 13

The reaction is carried out as in Example 6 with 101.5 g. (0.5 mol.) of 1,3-dichlorotetramethyldisiloxane, 101 g. (1 mol.) of triethylamine, 0.376 g. of zinc chloride and 87 g. (1.5 mol.) of propionaldehyde, the mixture being diluted with 100 cc. of benzene. The theoretical quantity of triethylamine hydrochloride is separated by filtration, and then distillation of the liquid phase gives 50.5 g. of 1,3-di-(1-propenyloxy)tetramethyldisiloxane, B.P.=88–90° C./25 mm. Hg, $n_D^{20}=1.4130$, $d_4^{20}=0.9132$.

EXAMPLE 14

140 g. of crotonaldehyde, 210 g. of triethylamine, 250 cc. of anhydrous benzene, 2 g. of zinc chloride, and 217 g. of trimethyl chlorosilane are successively introduced into a 1-litre autoclave, which is then heated to 65–70° C. for 7 hours with stirring. After cooling, the reaction mixture is filtered and the precipitate is washed with 500 cc. of diethyl ether. This precipitate, which is triethylamine hydrochloride, weighs 260 g. dry.

The filtrate and the washing ether are combined and distilled, first at atmospheric pressure to remove the solvents, and then under reduced pressure. The fraction boiling between 37 and 39° C./19 mm. Hg is (1,3-butadienyloxy)-trimethylsilane (217 g.), B.P.=36° C./16 mm. Hg, B.P.=131° C./760 mm. Hg, $n_D^{20}=1.4472$, $d_4^{20}=0.8237$.

EXAMPLE 15

In a 1-litre autoclave, a mixture of 110 g. of crotonaldehyde, 150 g. of triethylamine, 300 cc. of anhydrous benzene, 2 g. of zinc chloride, and 87 g. of dimethyldichlorosilane is heated at 70° C. for ten hours. After cooling, the reaction mixture is worked up as previously described and the precipitate of triethylamine hydrochloride obtained weighs 180 g. in the dry state. The solvents are distilled off at normal pressure, and the residue is distilled under reduced pressure (0.4 mm. Hg), the following fractions are collected: up to 54° C., 1 g.; 54° to 57° C., 80 g.; and 57° to 110° C., 21 g. The second fraction is dimethyl-bis-(1,3-butadienyl-1-oxy)silane, $n_D^{20}=1.4865$, $d_4^{20}=0.9120$.

EXAMPLE 16

A mixture of 100 g. of crotonaldehyde, 152 g. of triethylamine, 250 cc. of anhydrous benzene, 50 g. of methyltrichlorosilane, and 2 g. of zinc chloride is heated for 7 hours at 65° C. in an autoclave. The reaction mixture is then worked up as in Example 15 and 130 g. of triethylamine hydrochloride are obtained and then, by distillation, 27 g. of methyl-tris-(1,3-butadienyl-1-oxy)-silane, B.P.=89–92° C./0.3 mm. Hg, $n_D^{20}=1.5054$, $d_4^{20}=0.9628$.

EXAMPLE 17

100 g. of mesityl oxide, 202 g. of triethylamine, 110 g. of trimethylchlorosilane, and 2 g. of zinc chloride are successively introduced into a 1-litre autoclave and the mixture is heated with stirring at 160° C. for 8 hours. After cooling, the contents of the autoclave are worked up as in the preceding examples. 138 g. of triethylamine hydrochloride are separated by filtration and then, by distillation, 18 g. of mesityl oxide and 117 g. of a fraction boiling at 56–58.5° C./14 mm. Hg are obtained. The latter has B.P.=62° C./18 mm. Hg, $n_D^{20}=1.4488$, $d_4^{20}=0.8384$.

Examination of this fraction by infra-red spectography and by nuclear magnetic resonance shows that it consists of a mixture in substantially equal proportions of (1-methylene-3-methyl-2-butenyloxy) - trimethylsilane and (1,3-dimethyl-1,3-butadienyloxy)-trimethylsilane.

EXAMPLE 18

A mixture of 56 g. of isobutylidene acetone, 102 g. of triethylamine, 1 g. of zinc chloride, and 54 g. of trimethylchlorosilane is heated for 5 hours at 150° C. in a 0.5-litre autoclave. After cooling, the precipitate of triethylamine hydrochloride, which weighs 68 g., is filtered off, and the liquid residue is distilled. The fraction boiling at 70 to 77° C./14 mm. Hg (34 g.) is separated and redistilled. It then has B.P.=77° C./14 mm. Hg, $n_D^{20}=1.4635$, $d_4^{20}=0.842$. Examination by infra-red spectrography and by nuclear magnetic resonance shows that it contains 96% of (1,4-dimethyl-1,3-pentadienyloxy)-trimethylsilane.

EXAMPLE 19

76 g. of citral, 101 g. of triethylamine, 100 cc. of benzene, 2 g. of zinc chloride and 60 g. of trimethylchlorosilane are heated at 70° C. for 5 hours with stirring in a 0.5-litre autoclave. The mixture is then worked up as described in the previous Examples and 83 g. of a colourless oil are separated by distillation, B.P.=73–75° C./0.3 mm. Hg, $n_D^{20}=1.4746$, $d_4^{20}=0.8591$.

Examination of this fraction by nuclear magnetic resonance shows that it contains 86% of (3,7-dimethyl-1,3,6-octatrienyloxy)-trimethylsilane.

EXAMPLE 20

54 g. of 2-methyl-2-pentenal, 60 g. of triethylamine, 1 g. of zinc chloride, and 150 cc. of anhydrous benzene are introduced into a 1-litre round bottom flask equipped with a mechanical stirrer device, a reflux condenser connected to a drying tube, a dropping funnel, and a thermometer. 59 g. of trimethylchlorosilane are progressively added with stirring in 25 minutes, during which time the temperature of the reaction medium is raised from 23° C.

to 31° C. The mixture is then heated at 65–70° C. for 8 hours and, after cooling, the precipitate formed is filtered off and washed with 200 cc. of anhydrous diethyl ether. After removal of the solvents, the residue is distilled under reduced pressure (15 mm. Hg) and the following fractions are separated: up to 35° C., 27 g.; 35–66° C., 5 g.; and from 66 to 69° C., 31 g. This last fraction is (2 - methyl - 1,3 - pentadienyloxy)-trimethylsilane, $n_D^{20}$=1.4588, $d_4^{20}$=0.8374.

We claim:

1. Process for the preparation of an organosilicon compound containing a vinyloxy grouping attached to a silicon atom which comprises reacting an organosilicon compound of the formula:

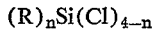

where $n$ is 1, 2, or 3 and R is alkyl of 1 to 6 carbon atoms or phenyl with an aldehyde or ketone having, in the enolic form, the formula:

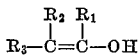

in which $R_1$, and $R_2$ and $R_3$ are each hydrogen, alkyl of 1 to 6 carbon atoms, cycloalkyl of 5 to 6 carbon atoms, phenyl, alkylphenyl of 7 to 12 carbon atoms, or phenylalkyl of 7 to 12 carbon atoms, in the presence of zinc chloride and a tertiary amine.

2. Process according to claim 1 in which the aldehyde or ketone is acetaldehyde.

3. Process according to claim 1 in which the organosilicon compound containing a chlorine atom attached to a silicon atom is methyltrichlorosilane, dimethyldichlorosilane, or trimethylchlorosilane.

4. Process according to claim 1 in which the said amine is trimethylamine.

5. Process according to claim 1 in which the reaction is carried out in an inert organic diluent.

References Cited

UNITED STATES PATENTS 2,917,530  12/1959  Bailey.

TOBIAS E. LEVOW, Primary Examiner

J. P. PODGORSKY, Assistant Examiner